US011394324B2

(12) United States Patent
Shaqqo et al.

(10) Patent No.: US 11,394,324 B2
(45) Date of Patent: Jul. 19, 2022

(54) SELECTIVE CROWBAR RESPONSE FOR A POWER CONVERTER TO MITIGATE DEVICE FAILURE

(71) Applicant: General Electric Company, Schenectady, NY (US)

(72) Inventors: Bacil Shaqqo, Roanoke, VA (US); Fernando Arturo Ramirez Sanchez, Salem, VA (US); Steven Wade Sutherland, Roanoke, VA (US)

(73) Assignee: General Electric Company, Schenectady, NY (US)

(*) Notice: Subject to any disclaimer, the term of this patent is extended or adjusted under 35 U.S.C. 154(b) by 14 days.

(21) Appl. No.: 16/716,930

(22) Filed: Dec. 17, 2019

(65) Prior Publication Data
US 2021/0184608 A1 Jun. 17, 2021

(51) Int. Cl.
| F03D 9/00 | (2016.01) |
| H02P 9/04 | (2006.01) |
| H02P 9/10 | (2006.01) |
| F03D 9/11 | (2016.01) |
| F03D 9/25 | (2016.01) |
| H02J 3/38 | (2006.01) |

(Continued)

(52) U.S. Cl.
CPC ............... *H02P 9/107* (2013.01); *F03D 9/11* (2016.05); *F03D 9/255* (2017.02); *H02J 3/381* (2013.01); *H02M 5/4585* (2013.01); *H02P 9/007* (2013.01); *H02J 2300/24* (2020.01); *H02J 2300/28* (2020.01)

(58) Field of Classification Search
CPC ...... H02P 9/007; H02P 9/107; H02M 5/4585; H02J 3/381; F03D 9/11; F03D 9/255
See application file for complete search history.

(56) References Cited

U.S. PATENT DOCUMENTS

| 7,102,247 B2 | 9/2006 | Feddersen |
| 7,518,256 B2 | 4/2009 | Juanarena Saragueta et al. |

(Continued)

FOREIGN PATENT DOCUMENTS

| CN | 101651330 A | 2/2010 |
| CN | 201623465 U | 11/2010 |

(Continued)

OTHER PUBLICATIONS

European Search Report for EP Application No. 20215038.9 dated Apr. 22, 2021.

*Primary Examiner* — Tulsidas C Patel
*Assistant Examiner* — Thomas K Quigley
(74) *Attorney, Agent, or Firm* — Dority & Manning, P.A.

(57) ABSTRACT

A method for operating a multi-level bridge power converter of an electrical power system includes connecting a plurality of phases of the power converter to a common terminal at a DC side of the power converter so as to effectively equate the plurality of phases at a common electrical potential. The method may also include monitoring, via a controller, a plurality of devices of the power converter for faults. Upon detection of a fault in one or more of the plurality of devices, the method includes activating, via the controller, one or more protection devices of a crowbar of the power converter to prevent additional faults from occurring in remaining devices of the plurality of devices by diverting energy away from the remaining devices of the plurality of devices.

11 Claims, 7 Drawing Sheets

(51) Int. Cl.
*H02M 5/458* (2006.01)
*H02P 9/00* (2006.01)

(56) References Cited

U.S. PATENT DOCUMENTS

| | | | |
|---|---|---|---|
| 7,978,445 B2 | 7/2011 | Ritter | |
| 8,154,833 B2 | 4/2012 | Ritter et al. | |
| 9,325,167 B2* | 4/2016 | Kumfer | H02H 7/22 |
| 9,577,421 B2* | 2/2017 | Barker | H02J 3/00 |
| 10,908,202 B1* | 2/2021 | Jia | H02J 3/381 |
| 2008/0303489 A1* | 12/2008 | Park | H02P 9/007 |
| | | | 322/20 |
| 2010/0207463 A1* | 8/2010 | Fortmann | F03D 9/255 |
| | | | 307/153 |
| 2011/0309805 A1* | 12/2011 | Matveev | H02J 3/1885 |
| | | | 322/61 |
| 2013/0057227 A1 | 3/2013 | Aurtenetxea et al. | |
| 2016/0146192 A1* | 5/2016 | Kurthakoti Chandrashekhara | F03D 9/255 |
| | | | 290/44 |
| 2016/0372912 A1* | 12/2016 | Barker | F03D 7/0284 |
| 2018/0109201 A1* | 4/2018 | Li | H02K 7/183 |
| 2018/0198376 A1* | 7/2018 | Wagoner | H02H 7/1216 |

FOREIGN PATENT DOCUMENTS

| | | |
|---|---|---|
| CN | 102005716 B | 7/2014 |
| EP | 1499009 B1 | 10/2007 |

\* cited by examiner

SELECTIVE CROWBAR RESPONSE FOR A POWER CONVERTER TO MITIGATE DEVICE FAILURE

FIELD

The present disclosure relates generally to electrical power systems, and more particularly to selective crowbar response for power converters of electrical power systems to mitigate device failure.

BACKGROUND

Wind turbines have received increased attention as a renewable energy source. Wind turbines use the wind to generate electricity. The wind turns multiple blades connected to a rotor. The spin of the blades caused by the wind spins a shaft of the rotor, which connects to a generator that generates electricity. Certain wind turbines include a doubly fed induction generator (DFIG) to convert wind energy into electrical power suitable for output to an electrical grid. DFIGs are typically connected to a converter that regulates the flow of electrical power between the DFIG and the grid. More particularly, the converter allows the wind turbine to output electrical power at the grid frequency regardless of the rotational speed of the wind turbine blades.

A typical DFIG system includes a wind driven DFIG having a rotor and a stator. The stator of the DFIG is coupled to the electrical grid through a stator bus. A power converter is used to couple the rotor of the DFIG to the electrical grid. The power converter can be a two-stage power converter including both a rotor side converter and a line side converter. The rotor side converter can receive alternating current (AC) power from the rotor via a rotor bus and can convert the AC power to a DC power. The line side converter can then convert the DC power to AC power having a suitable output frequency, such as the grid frequency. The AC power is provided to the electrical grid via a line bus. An auxiliary power feed can be coupled to the line bus to provide power for components used in the wind turbine system, such as fans, pumps, motors, and other components of the wind turbine system.

A typical DFIG system includes a two-winding transformer having a high voltage primary (e.g. greater than 12 KVAC) and a low voltage secondary (e.g. 575 VAC, 690 VAC, etc.) to couple the DFIG system to the electrical grid. The high voltage primary can be coupled to the high voltage electrical grid. The stator bus providing AC power from the stator of the DFIG and the line bus providing AC power from the power converter can be coupled to the low voltage secondary. In this system, the output power of the stator and the output power of the power converter are operated at the same voltage and combined into the single transformer secondary winding at the low voltage.

More recently, DFIG systems have included a three winding transformer to couple the DFIG system to the electrical grid. The three winding transformer can have a high voltage (e.g. greater than 12 KVAC) primary winding coupled to the electrical grid, a medium voltage (e.g. 6 KVAC) secondary winding coupled to the stator bus, and a low voltage (e.g. 575 VAC, 690 VAC, etc.) auxiliary winding coupled to the line bus. The three winding transformer arrangement can be preferred in increased output power systems (e.g. 3 MW systems) as it reduces the current in the stator bus and other components on the stator side of the DFIG.

During operation of wind turbine systems, including DFIG systems, various fault events can occur, including grid under-voltage or over-voltage conditions and faults within the power system and/or associated wind turbine. This can result in excessive energy in the power converter, which can cause damage to the converter.

Various approaches have been utilized to reduce the risk of overvoltage conditions in power converters. For example, crowbars have been utilized as the initial action to prevent excess energy from reaching the power converter when a grid faults occur. Brake choppers have also been utilized as the initial action to absorb such excess energy. Moreover, during a device failure on a multi-level bridge power converter, continued operation without addressing the initial failure can incite failure propagation, which can damage all devices in the power converter. Thus, if the initial failure is not quickly controlled, damage can occur in the remaining phases, effectively destroying the entire converter.

Accordingly, improved methods for operating multi-level bridge power converters of electrical power systems that address the aforementioned issues are desirable in the art. In particular, improved methods which utilize selective crowbar response for power converters of electrical power systems to mitigate device failure would be advantageous.

BRIEF DESCRIPTION

Aspects and advantages of the invention will be set forth in part in the following description, or may be obvious from the description, or may be learned through practice of the invention.

In one aspect, the present disclosure is directed to a method for operating a multi-level bridge power converter of an electrical power system. The power converter includes a rotor-side converter coupled to a line-side converter via a DC link. The method includes connecting a plurality of phases of the power converter to a common terminal at a DC side of the power converter so as to effectively equate the plurality of phases at a common electrical potential. The method may also include monitoring, via a controller, a plurality of devices of the power converter for faults. Upon detection of a fault in one or more of the plurality of devices, the method includes activating, via the controller, one or more protection devices of a crowbar of the power converter to prevent additional faults from occurring in remaining devices of the plurality of devices by diverting energy away from the remaining devices of the plurality of devices.

In an embodiment, the method may also include detecting, via the controller, a location of the fault in the one or more of the plurality of devices. In such embodiments, activating the crowbar of the power converter to prevent additional faults of the plurality of devices may include selecting a crowbar response from a plurality of crowbar responses based on the location of the fault in the one or more of the plurality of devices and activating the selected crowbar response.

In particular embodiments, the fault may be a bridge fault on a bridge circuit of the power converter.

In another embodiment, the protection device(s) may include a fuse, a switching element, or combinations thereof. In certain embodiments, the protection device(s) may include one or more switching elements of at least one of the rotor-side converter or the line-side converter. Alternatively, the protection device(s) may include one or more switching elements disposed upstream or downstream of at least one of the rotor-side converter or the line-side converter.

In further embodiments, the plurality of devices may include one or more semiconductor switches.

In additional embodiments, the electrical power system may include a wind turbine power system, a solar power system, an energy storage power system or combinations thereof.

In another aspect, the present disclosure is directed to an electrical power system. The electrical power system includes a doubly fed induction generator having a rotor and a stator. The stator provides AC power to a stator bus. The system also includes a multi-level bridge power converter coupled to the rotor of the doubly fed induction generator. The power converter provides an output to a line bus and includes a rotor-side converter, a line-side converter, a DC link, and a plurality of phases connected to a common terminal at a DC side of the power converter so as to effectively equate the plurality of phases at a common electrical potential. Further, the system includes a controller communicatively coupled to the power converter. The controller is configured to perform a plurality of operations, including but not limited to monitoring a plurality of devices of the power converter for faults and upon detection of a fault in one or more of the plurality of devices, activating, via the controller, one or more protection devices of a crowbar of the power converter to prevent additional faults from occurring in remaining devices of the plurality of devices by diverting energy away from the remaining devices of the plurality of devices. It should be understood that the electrical power system may further include any of the additional features described herein.

In yet another aspect, the present disclosure is directed to a method for operating a multi-level bridge power converter of an electrical power system. The power converter includes a rotor-side converter coupled to a line-side converter via a DC link. The method includes connecting a plurality of phases of the power converter to a common terminal at a DC side of the power converter. Further, the method includes monitoring, via a controller, one or more parameters of a plurality of devices of the power converter. Upon detection of the one or more parameters being indicative of a fault occurring in one or more of the plurality of devices, the method includes activating, via the controller, one or more protection devices of a crowbar of the power converter to prevent additional faults from occurring in remaining devices of the plurality of devices by diverting energy away from the remaining devices of the plurality of devices.

In such embodiments, the parameter(s) may include at least one of a current, a voltage, a desaturation event, or combinations thereof. It should be understood that the method may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
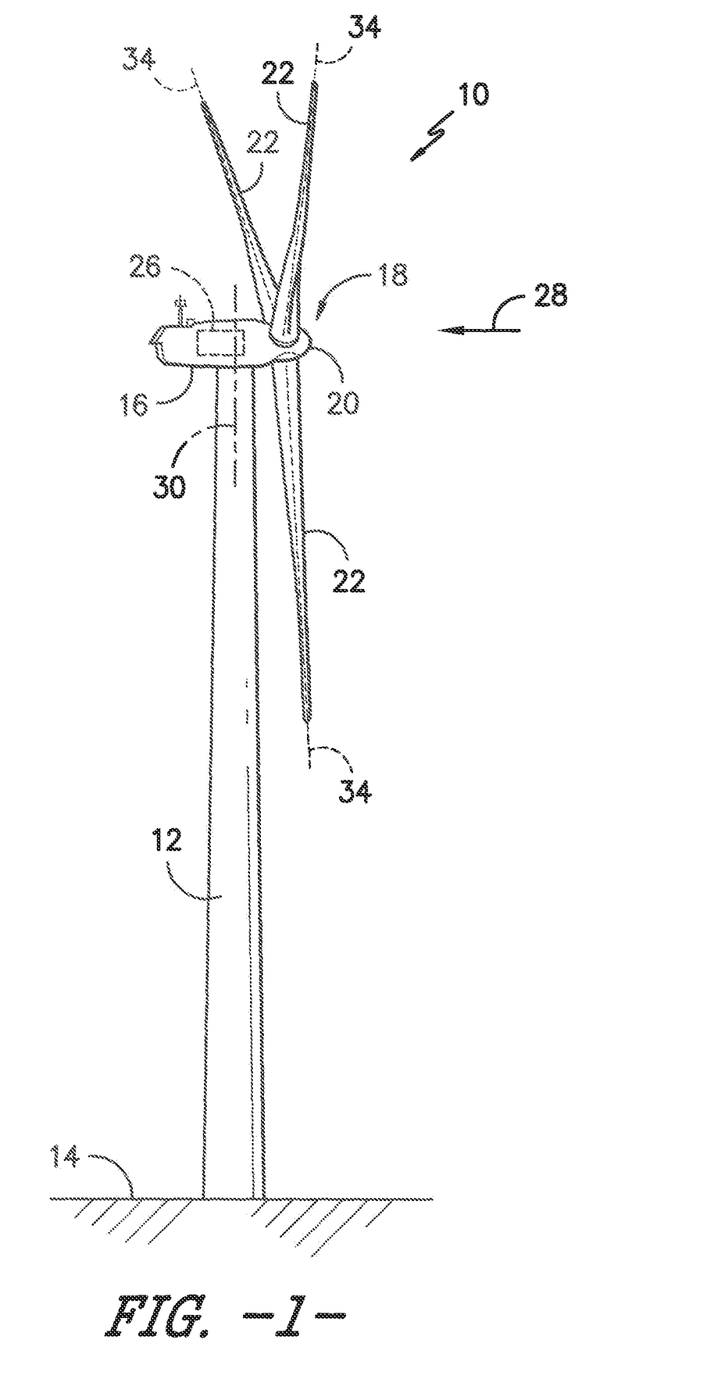
FIG. 1 illustrates a perspective view of one embodiment of a wind turbine according to the present disclosure.

Referring now to the drawings, FIG. 1 illustrates a perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown, the wind turbine 10 may also include a turbine control system or a turbine controller 26 centralized within the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10. For example, the controller 26 may be configured to control the blade pitch or pitch angle of each of the rotor blades 22 (i.e., an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to various pitch drives or pitch adjustment mechanisms 32 (FIG. 2) of the wind turbine 10. Specifically, the rotor blades 22 may be rotatably mounted to the hub 20 by one or more pitch bearing(s) (not illustrated) such that the pitch angle may be adjusted by rotating the rotor blades 22 about their pitch axes 34 using the pitch adjustment mechanisms 32. Further, as the direction 28 of the wind changes, the turbine controller 26 may be configured to control a yaw direction of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10 such that the nacelle 16 may be rotated about the yaw axis 30.

Still further, the turbine controller 26 may be configured to control the torque of the generator 24. For example, the turbine controller 26 may be configured to transmit control signals/commands to the generator 24 in order to modulate the magnetic flux produced within the generator 24, thus adjusting the torque demand on the generator 24. Such temporary de-rating of the generator 24 may reduce the rotational speed of the rotor blades 22, thereby reducing the aerodynamic loads acting on the blades 22 and the reaction loads on various other wind turbine 10 components.

Figure 3:
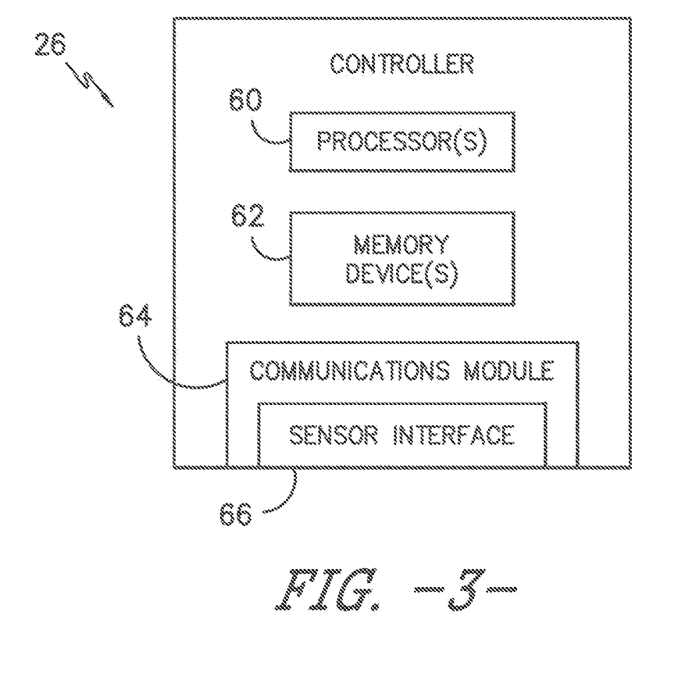
FIG. 3 illustrates a schematic diagram of one embodiment of suitable components that may be included within a controller of a wind turbine and/or electrical power system according to the present disclosure.

It should be appreciated that the turbine controller 26 may generally comprise a computer or any other suitable processing unit. Thus, in several embodiments, the turbine controller 26 may include one or more processor(s) and associated memory device(s) configured to perform a variety of computer-implemented functions, as shown in FIG. 3 and discussed herein. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the turbine controller 26 may generally include memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 26 to perform various computer-implemented functions including, but not limited to, performing proportional integral derivative ("PID") control algorithms, including various calculations within one or more PID control loops, and various other suitable computer-implemented functions. In addition, the turbine controller 26 may also include various input/output channels for receiving inputs from sensors and/or other measurement devices and for sending control signals to various components of the wind turbine 10.

It should additionally be understood that the controller 26 may be a singular controller or include various components, such as pitch controllers and/or yaw controllers, which communicate with a central controller for specifically controlling pitch and yaw as discussed. Additionally, the term "controller" may also encompass a combination of computers, processing units and/or related components in communication with one another.

Figure 2:
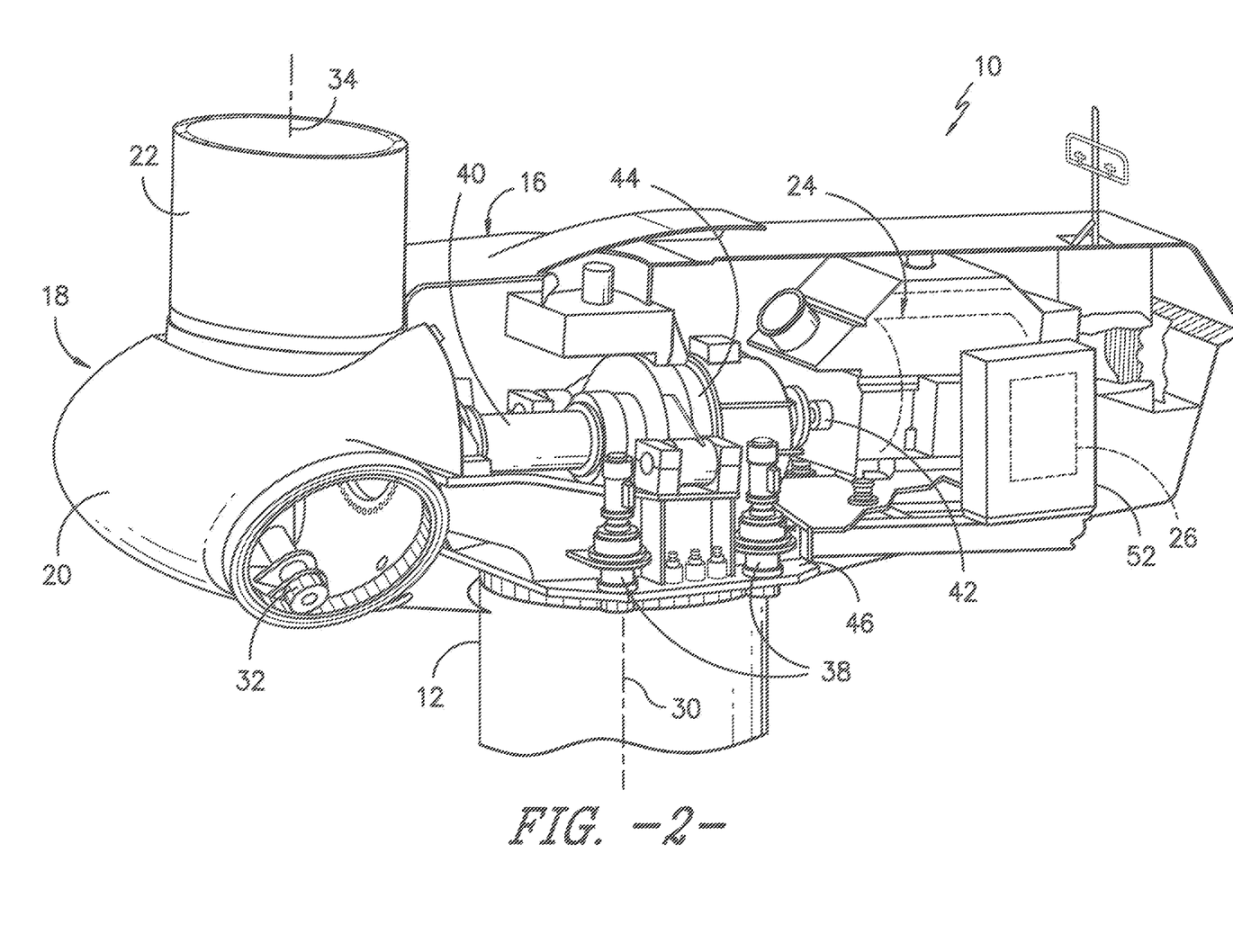
FIG. 2 illustrates a perspective, internal view of one embodiment of a nacelle of a wind turbine according to the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. However, in other embodiments, it should be appreciated that the generator shaft 42 may be rotatably coupled directly to the rotor shaft 40. Alternatively, the generator 24 may be directly rotatably coupled to the rotor shaft 40 (often referred to as a "direct-drive wind turbine").

It should be appreciated that the rotor shaft 40 may generally be supported within the nacelle by a support frame or bedplate 46 positioned atop the wind turbine tower 12. For example, the rotor shaft 40 may be supported by the bedplate 46 via a pair of pillow blocks 48, 50 mounted to the bedplate 46.

Additionally, as indicated herein, the turbine controller 26 may also be located within the nacelle 16 of the wind turbine 10. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, as described herein, the turbine controller 26 may also be communicatively coupled to various components of the wind turbine 10 for generally controlling the wind turbine and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Similarly, the turbine controller 26 may also be communicatively coupled to each pitch adjustment mechanism 32 of the wind turbine 10 (one of which is shown) for controlling and/or altering the pitch angle of the rotor blades 22 relative to the direction 28 of the wind. For instance, the turbine controller 26 may be configured to transmit a control signal/command to each pitch adjustment mechanism 32 such that one or more actuators (not shown) of the pitch adjustment mechanism 32 may be utilized to rotate the blades 22 relative to the hub 20. In particular, the controller 26 may be utilized to perform such methods and may further control torque adjustment of the generator 24, yaw adjustment of the wind turbine 10, and/or pitch adjustment of the rotor blades 22 based on such methods as discussed herein.

Referring now to FIG. 3, there is illustrated a block diagram of one embodiment of suitable components that may be included within the turbine controller 26 in accordance with aspects of the present subject matter. As shown, the controller 26 may include one or more processor(s) 60 and associated memory device(s) 62 configured to perform a variety of computer-implemented functions (e.g., performing the methods, steps, calculations and the like disclosed herein). Additionally, the controller 26 may also include a communications module 64 to facilitate communications between the controller 26 and the various components of the wind turbine 10. For instance, the communications module 64 may serve as an interface to permit the turbine controller 26 to transmit control signals to each pitch adjustment mechanism 32 for controlling the pitch angle of the rotor blades 22. Moreover, the communications module 64 may include a sensor interface 66 (e.g., one or more analog-to-digital converters) to permit input signals transmitted from, for example, various sensors, to be converted into signals that can be understood and processed by the processors 60.

Figure 4:
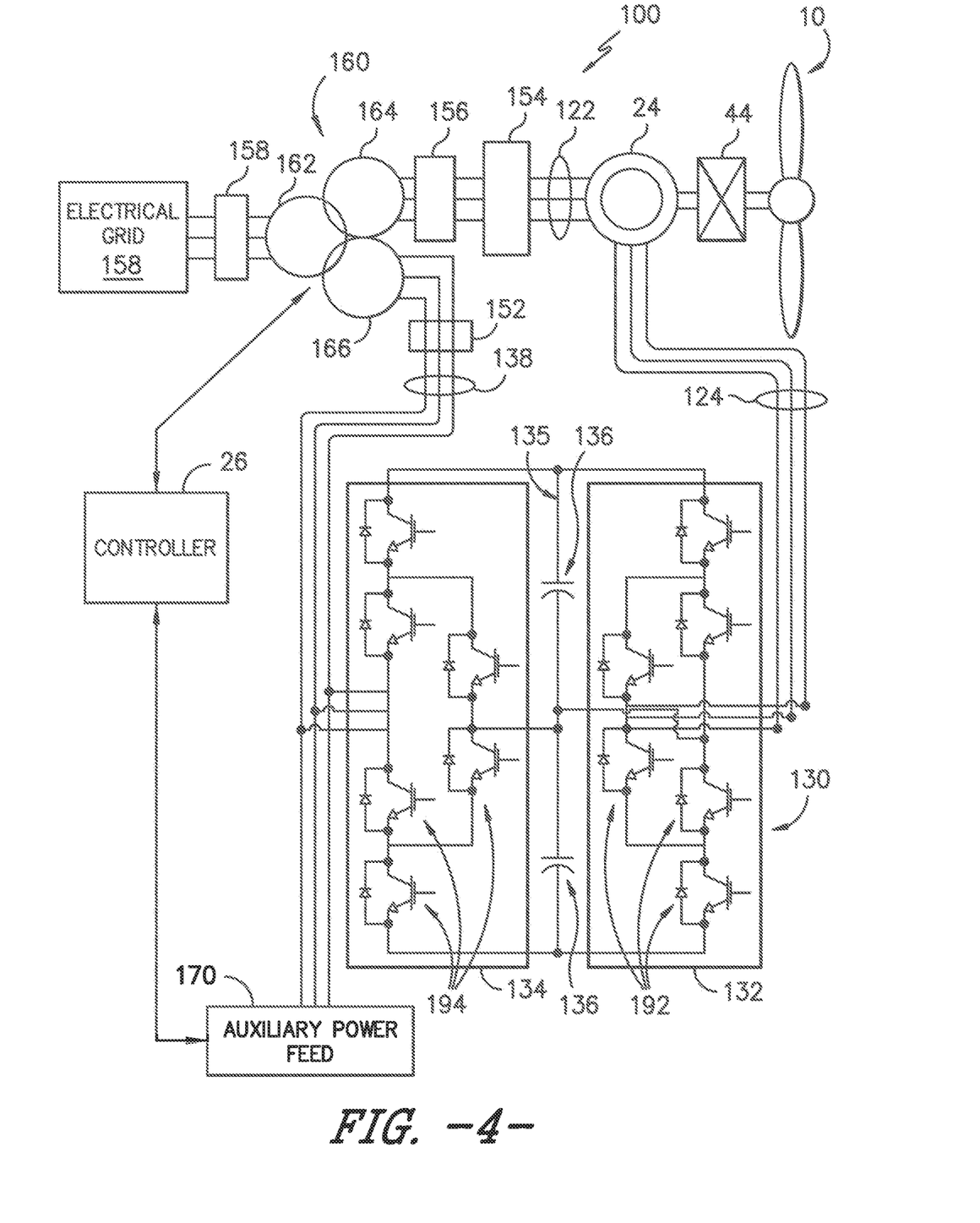
FIG. 4 illustrates a schematic diagram of one embodiment of an electrical power system according to the present disclosure.
Figure 5:
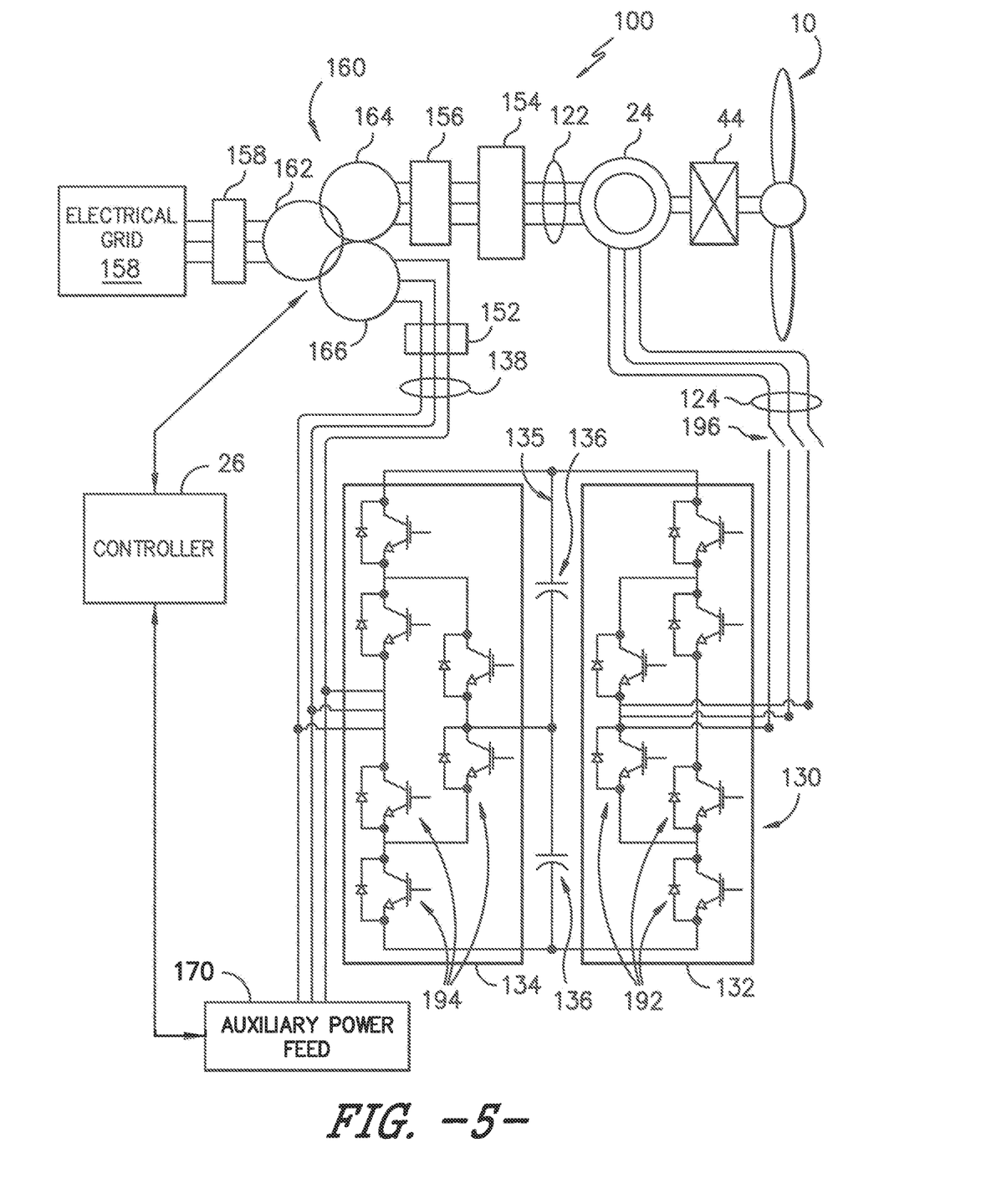
FIG. 5 illustrates a schematic diagram of one embodiment of an electrical power system according to the present disclosure.

Referring now to FIGS. 4 and 5, embodiments of an electrical power system 100 are illustrated according to the present disclosure. In particular, as shown, the system 100 is a doubly-fed induction generator (DFIG) wind turbine system. Further, as shown, the system 100 includes the wind turbine 10, as discussed above, and an optional gearbox 44, which is, in turn, coupled to a generator 24. In accordance with aspects of the present disclosure, the generator 24 is a doubly fed induction generator (DFIG) 24. It should be understood, however, that the present disclosure is not limited to DFIG systems 100 and DFIGs 24, and rather that any suitable system and generator, including for example full power conversion systems and generators, is within the scope and spirit of the present disclosure.

The DFIG 24 is typically coupled to a stator bus 122 and a power converter 130 via a rotor bus 124. The stator bus 122 provides an output multiphase power (e.g. three-phase power) from a stator of the DFIG 24 and the rotor bus 124 provides an output multiphase power (e.g. three-phase power) of the rotor of DFIG 24. Referring to the power converter 130, the DFIG 24 is coupled via the rotor bus 124 to a rotor side converter 132. The rotor side converter 132 is coupled to a line side converter 134 which in turn is coupled to a line side bus 138.

The power converter 130 may include one or more rotor side switching elements 192, which may be components of the rotor side converter 132, and one or more line side switching elements 194, which may be components of the line side converter 134. The switching elements 192 for the various phases of the rotor side converter 132 may be included in the bridge of the rotor side converter 132, and the switching elements 194 for the various phases of the line side converter 134 may be included in the bridge of the line side converter 134. The switching elements 192, 194 in exemplary embodiments may be IGBTs. For example, in exemplary configurations, the rotor side converter 132 and the line side converter 134 are configured for normal operating mode in a three-phase, pulse width modulation (PWM) arrangement using insulated gate bipolar transistors (IGBTs) as switching devices. Other suitable switching devices can be used, such as insulated gate commuted thyristors, MOSFETs, bipolar transistors, silicon controlled rectifiers, or other suitable switching devices. The rotor side converter 132 and the line side converter 134 can be coupled via a DC link 135 across which is the DC link capacitor 136.

In some embodiments, a plurality of rotor-side converters 132 and/or line side converters 134 may be utilized, with the plurality of rotor-side converters 132 and/or line side converters 134 electrically coupled together in parallel.

The power converter 130 can be communicatively coupled to controller 26 to control the operation of the rotor side converter 132 and the line side converter 134. For instance, the controller 26 can send control commands to the rotor side converter 132 and line side converter 134 to control the modulation of switching elements (such as IGBTs) used in the power converter 130 to provide a desired real and reactive power output.

As illustrated, the system 100 may also include a transformer 160 coupling the wind turbine system 100 to an electrical grid 168. In an embodiment, as shown, the transformer 160 may be a three-winding transformer that includes a high voltage (e.g. greater than 12 KVAC) primary winding 162 coupled to the electrical grid 168, a medium voltage (e.g. 6 KVAC) secondary winding 164 coupled to the stator bus 122, and a low voltage (e.g. 575 VAC, 690 VAC, etc.) auxiliary winding 166 coupled to the line bus 138. It should be understood that the transformer 160 can be a three-winding transformer as shown, or alternatively may be a two-winding transformer having only a primary winding 162 and a secondary winding 164; may be a four-winding transformer having a primary winding 162, a secondary winding 164, an auxiliary winding 166, and an additional auxiliary winding; or may have any other suitable number of windings.

An auxiliary power feed 170 is coupled to the output of the power converter 130. The auxiliary power feed 170 acts as a power source for various components of the wind turbine system 100. For instance, the auxiliary power feed 170 can power fans, pumps, motors, and other suitable components of the wind turbine system 100.

In operation, power generated at the DFIG 24 by rotating the rotor 106 is provided via a dual path to electrical grid 168. The dual paths are defined by the stator bus 122 and the rotor bus 124. On the rotor bus 124 side, sinusoidal multi-phase (e.g. three-phase) alternating current (AC) power is provided to the power converter 130. The rotor side power converter 132 converts the AC power provided from the rotor bus 124 into direct current (DC) power and provides the DC power to the DC link 135. Switching devices (e.g. IGBTs) used in parallel bridge circuits of the rotor side power converter 132 can be modulated to convert the AC power provided from the rotor bus 124 into DC power suitable for the DC link 135.

The line side converter 134 converts the DC power on the DC link 135 into AC power at a frequency suitable for the electrical grid 168. In particular, switching devices (e.g. IGBTs) used in bridge circuits of the line side power converter 134 can be modulated to convert the DC power on the DC link 135 into AC power on the line side bus 138. The power from the power converter 130 can be provided via the auxiliary winding 166 of the transformer 160 to the electrical grid 168.

The power converter 130 can receive control signals from, for instance, the controller 26. The control signals can be based, among other things, on sensed conditions or operating characteristics of the wind turbine system 100. For instance, the control signals can be based on sensed voltage associated with the transformer 160 as determined by a voltage sensor 144. As another example, the control signals can be based on sensed voltage associated with the auxiliary power feed 170 as determined by a voltage sensor 146.

Typically, the control signals provide for control of the operation of the power converter 130. For example, feedback in the form of sensed speed of the DFIG 24 can be used to control the conversion of the output power from the rotor bus 156 to maintain a proper and balanced multi-phase (e.g. three-phase) power supply. Other feedback from other sensors can also be used by the controller 26 to control the power converter 130, including, for example, stator and rotor bus voltages and current feedbacks. Using the various forms of feedback information, switching control signals (e.g. gate timing commands for IGBTs), stator synchronizing control signals, and circuit breaker signals can be generated.

On the stator bus 122 side, sinusoidal multi-phase (e.g. three-phase) alternating current (AC) power is provided from the stator of the generator 120 to the stator bus 122, and from the stator bus 122 to the transformer 160, and in particular to the secondary winding 164 thereof. Various circuit breakers, fuses, contactors, and other devices, such as grid circuit breaker 158, stator bus circuit breaker 156, switch 154, and line bus circuit breaker 152, can be included in the system 100 to connect or disconnect corresponding buses, for example, when current flow is excessive and can damage components of the wind turbine system 100 or for other operational considerations. Additional protection components can also be included in the wind turbine system 100.

Additionally, in some embodiments, a crowbar may be provided in the power converter 130. In certain embodiments, the crowbar may include one or more protection devices including, for example, a fuse, a switching element, or combinations thereof. For example, as illustrated in FIG. 4, the protection device(s) may include the rotor-side switching elements 192 and/or line-side switching elements 194. In alternative embodiments, as illustrated in FIG. 5, the protection devices may include additional switching elements 196 that are included in the power converter 130 and located upstream and/or downstream of the rotor-side converter 132 and/or line-side converter 134. Thus, in an embodiment, when the crowbar is activated, the switching elements (i.e. elements 192 or elements 196) may be gated on. When the crowbar is deactivated, the switching elements (i.e. elements 192 or elements 196) may be gated off.

Figure 6:
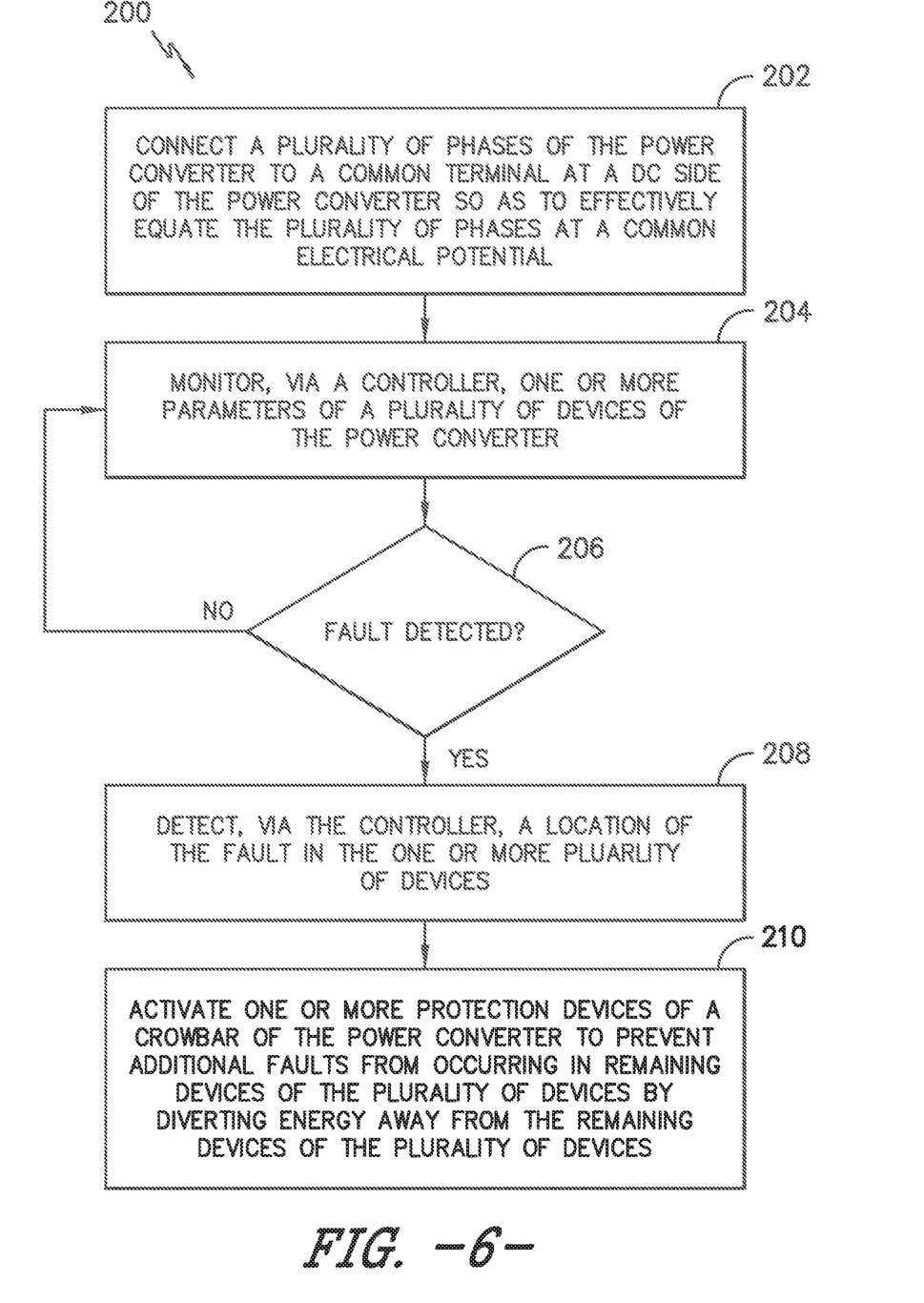
FIG. 6 illustrates a flow chart of one embodiment of a method according to the present disclosure.

Referring now to FIGS. 4 through 6, the present disclosure is further directed to methods for operating electrical power systems 100. In some embodiments, the controller 26 is configured to perform such operations. More specifically, FIG. 6 illustrates a flow diagram of one embodiment of a method 200 for operating a multi-level bridge power converter of an electrical power system according to the present disclosure. In general, the method 200 will be described herein with reference to the wind turbine 10, the electrical power system 100, and the controller 26 illustrated in FIGS. 1-5. However, it should be appreciated that the disclosed method 200 may be implemented with wind turbines and power systems having any other suitable configurations, such as, for example, a solar power system, an energy storage power system, or combinations thereof.

In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 includes connecting a plurality of phases of the power converter 130 to a common terminal at a DC side of the power converter so as to effectively equate the plurality of phases at a common electrical potential. As shown at (204), the method 200 includes monitoring, via the controller 26, a plurality of devices of the power converter 130 for faults. For example, in particular embodiments, the fault may be a bridge fault on a bridge circuit of the power converter 130. As such, the fault may be experienced in one or more of the switching elements (i.e. semiconductor switches) of the power converter 130.

As shown at (206), the method 200 determines whether a fault is detected. Upon detection of a fault in one or more of the plurality of devices, as shown at (208), the method 200 may also include detecting, via the controller 26, a location of the fault in the one or more of the plurality of devices. Thus, as shown at (210), the method 200 further includes activating, via the controller 26, one or more protection devices of a crowbar of the power converter 130 to prevent additional faults from occurring in remaining devices of the plurality of devices by diverting energy away from the remaining devices of the plurality of devices. If not, the method 200 continues monitoring as shown (204).

More specifically, in an embodiment, the controller 26 may activate the crowbar of the power converter 130 by selecting a crowbar response from a plurality of crowbar responses based on the location of the fault in the one or more of the devices and activating the selected crowbar response. Accordingly, the use of a crowbar will create an immediate transient that will activate the protective devices (e.g. the fuses or protective switch gear) quickly before further damage to the bridge circuit is caused.

Figure 7:
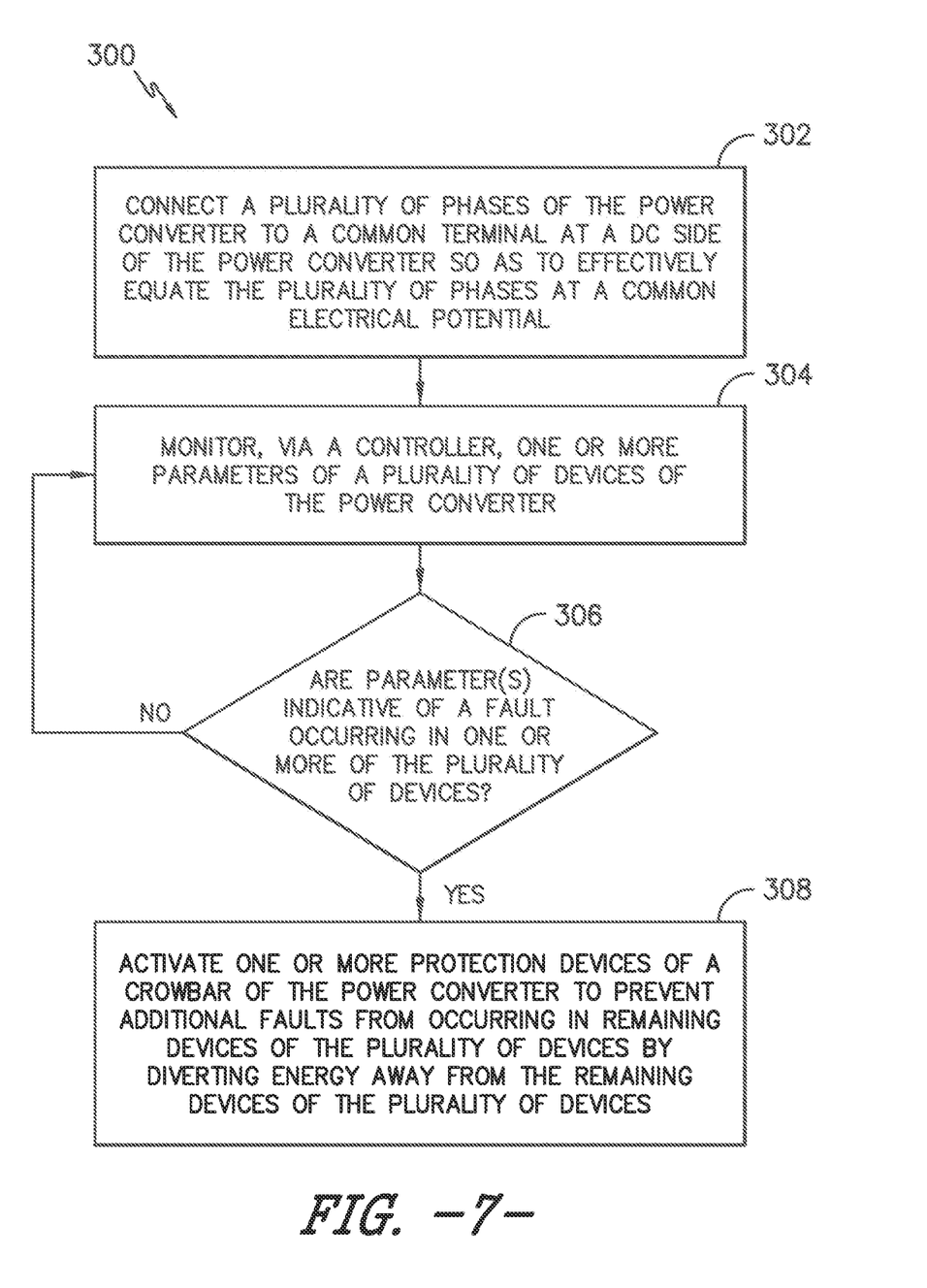
FIG. 7 illustrates a flow chart of another embodiment of a method according to the present disclosure.

Referring now to FIG. 7, a flow diagram of another embodiment of a method 300 for operating a multi-level bridge power converter of an electrical power system according to the present disclosure. In general, the method 300 will be described herein with reference to the wind turbine 10, the electrical power system 100, and the controller 26 illustrated in FIGS. 1-5. However, it should be appreciated that the disclosed method 300 may be implemented with wind turbines and power systems having any other suitable configurations, such as, for example, a solar power system, an energy storage power system, or combinations thereof.

In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (302), the method 300 includes connecting a plurality of phases of the power converter 130 to a common terminal at a DC side of the power converter 130. As shown at (304), the method 300 includes monitoring, via the controller 26, one or more parameters of a plurality of devices of the power converter 130. For example, in such embodiments, the parameter(s) may include at least one of a current, a voltage, a desaturation event, or combinations thereof. As shown at (306), the method 300 includes determining whether the parameter(s) are indicative of a fault occurring in one or more of the plurality of devices. If so, as shown at (308), the method 300 includes activating, via the controller 26, one or more protection devices of the crowbar of the power converter 130 to prevent additional faults from occurring in remaining devices of the plurality of devices by diverting energy away from the remaining devices of the plurality of devices.

Various aspects and embodiments of the present invention are defined by the following numbered clauses:

Clause 1. A method for operating a multi-level bridge power converter of an electrical power system, the power converter comprising a rotor-side converter coupled to a line-side converter via a DC link, the method comprising:

connecting a plurality of phases of the power converter to a common terminal at a DC side of the power converter so as to effectively equate the plurality of phases at a common electrical potential;

monitoring, via a controller, a plurality of devices of the power converter for faults; and, upon detection of a fault in one or more of the plurality of devices, activating, via the controller, one or more protection devices of a crowbar of the power converter to prevent additional faults from occurring in remaining devices of the plurality of devices by diverting energy away from the remaining devices of the plurality of devices.

Clause 2. The method of clause 1, further comprising detecting, via the controller, a location of the fault in the one or more of the plurality of devices.

Clause 3. The method of any of the preceding clauses, wherein activating the crowbar of the power converter to prevent additional faults of the plurality of devices further comprises:
selecting a crowbar response from a plurality of crowbar responses based on the location of the fault in the one or more of the plurality of devices; and,
activating the selected crowbar response.

Clause 4. The method of any of the preceding clauses, wherein the fault comprises a bridge fault on a bridge circuit of the power converter.

Clause 5. The method of any of the preceding clauses, wherein the one or more protection devices comprises at least one of a fuse, a switching element, or combinations thereof.

Clause 6. The method of any of the preceding clauses, wherein the one or more protection devices comprises one or more switching elements of at least one of the rotor-side converter or the line-side converter.

Clause 7. The method of any of the preceding clauses, wherein the one or more protection devices comprises one or more switching elements disposed upstream or downstream of at least one of the rotor-side converter or the line-side converter.

Clause 8. The method of any of the preceding clauses, wherein the plurality of devices comprise one or more semiconductor switches.

Clause 9. The method of any of the preceding clauses, wherein the electrical power system comprises a wind turbine power system, a solar power system, an energy storage power system or combinations thereof.

Clause 10. An electrical power system, comprising: a doubly fed induction generator having a rotor and a stator, the stator providing AC power to a stator bus;
a multi-level bridge power converter coupled to the rotor of the doubly fed induction generator, the power converter providing an output to a line bus, the power converter comprising a rotor-side converter, a line-side converter, a DC link, and a plurality of phases connected to a common terminal at a DC side of the power converter so as to effectively equate the plurality of phases at a common electrical potential; and,
a controller communicatively coupled to the power converter, the controller configured to perform a plurality of operations, the plurality of operations comprising: monitoring a plurality of devices of the power converter for faults; and,
upon detection of a fault in one or more of the plurality of devices, activating, via the controller, one or more protection devices of a crowbar of the power converter to prevent additional faults from occurring in remaining devices of the plurality of devices by diverting energy away from the remaining devices of the plurality of devices.

Clause 11. The electrical power system of clause 10, further comprising detecting, via the controller, a location of the fault in the one or more of the plurality of devices.

Clause 12. The electrical power system of clause 11, wherein activating the crowbar of the power converter to prevent additional faults of the plurality of devices further comprises:
selecting a crowbar response from a plurality of crowbar responses based on the location of the fault in the one or more of the plurality of devices; and, activating the selected crowbar response.

Clause 13. The electrical power system clauses 10-12, wherein the fault comprises a bridge fault on a bridge circuit of the power converter.

Clause 14. The electrical power system clauses 10-13, wherein the one or more protection devices comprising a fuse or a switching element.

Clause 15. The electrical power system clauses 10-14, wherein the one or more protection devices comprises switching elements of at least one of the rotor-side converter or the line-side converter.

Clause 16. The electrical power system clauses 10-15, wherein the one or more protection devices comprises switching elements disposed upstream of the rotor-side converter within the power converter.

Clause 17. The electrical power system of clauses 10-16, wherein the electrical power system comprises a wind turbine power system, a solar power system, an energy storage power system or combinations thereof.

Clause 18. A method for operating a multi-level bridge power converter of an electrical power system, the power converter comprising a rotor-side converter coupled to a line-side converter via a DC link, the method comprising:
connecting a plurality of phases of the power converter to a common terminal at a DC side of the power converter;
monitoring, via a controller, one or more parameters of a plurality of devices of the power converter; and,
upon detection of the one or more parameters being indicative of a fault occurring in one or more of the plurality of devices, activating, via the controller, one or more protection devices of a crowbar of the power converter to prevent additional faults from occurring in remaining devices of the plurality of devices by diverting energy away from the remaining devices of the plurality of devices.

Clause 19. The method of clause 18, wherein the one or more parameters comprise at least one of a current, a voltage, a desaturation event, or combinations thereof.

Clause 20. The method of clauses 18-19, further comprising detecting, via the controller, a location of the fault in the one or more of the plurality of devices, wherein activating the crowbar of the power converter to prevent additional faults of the plurality of devices further comprises selecting a crowbar response from a plurality of crowbar responses based on the location of the fault in the one or more of the plurality of devices and activating the selected crowbar response.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a multi-level bridge power converter of an electrical power system connected to a power grid, the power converter comprising a rotor-side converter coupled to a line-side converter via a DC link, the rotor-side converter or the line-side converter comprising a bridge comprising one or more protection devices, the method comprising:

connecting a plurality of phases of the power converter to a common terminal at a DC side of the power converter so as to effectively equate the plurality of phases at a common electrical potential;

monitoring, via a controller, a plurality of devices of the multi-level bridge power converter for faults;

detecting, via the controller, a location of the bridge fault in the one or more of the plurality of devices; and, upon detection of a bridge fault in one or more of the plurality of devices of the multi-level bridge power converter, activating, via the controller, the one or more protection devices of the multi-level bridge power converter to prevent additional bridge faults from occurring in remaining devices of the plurality of devices by: selecting a response from a plurality of protection responses based on the location of the fault, activating the selected response, the selected response comprising activating one or more switching elements of the bridge of the rotor-side converter or of the bridge of the line-side converter, and diverting energy away from the remaining devices of the plurality of devices while maintaining connection of the multi-level bridge power converter to the power grid.

2. The method of claim 1, wherein the one or more protection devices comprises at least one of a fuse, a switching element, or combinations thereof.

3. The method of claim 1, wherein the one or more protection devices comprises one or more switching elements disposed upstream or downstream of at least one of the rotor-side converter or the line-side converter.

4. The method of claim 1, wherein the plurality of devices comprise one or more semiconductor switches.

5. The method of claim 1, wherein the electrical power system comprises a wind turbine power system, a solar power system, an energy storage power system or combinations thereof.

6. An electrical power system, comprising:

a doubly fed induction generator having a rotor and a stator, the stator providing AC power to a stator bus;

a multi-level bridge power converter coupled to the rotor of the doubly fed induction generator, the multi-level bridge power converter providing an output to a line bus, the power converter comprising a rotor-side converter, a line-side converter, a DC link, the rotor-side converter or the line-side converter comprising a bridge comprising one or more protection devices, and a plurality of phases connected to a common terminal at a DC side of the multi-level bridge power converter so as to effectively equate the plurality of phases at a common electrical potential; and, a controller communicatively coupled to the multi-level bridge power converter, the controller configured to perform a plurality of operations, the plurality of operations comprising:

monitoring a plurality of devices of the power converter for faults;

detecting, via the controller, a location of the bridge fault in the one or more of the plurality of devices; and, upon detection of a bridge fault in one or more of the plurality of devices of the multi-level bridge power converter, activating, via the controller, the one or more protection devices of the multi-level bridge power converter to prevent additional bridge faults from occurring in remaining devices of the plurality of devices by: selecting a response from a plurality of protection responses based on the location of the fault, activating the selected response, the selected response comprising activating one or more switching elements of the bridge of the rotor-side converter or of the bridge of the line-side converter, and diverting energy away from the remaining devices of the plurality of devices while maintaining connection of the multi-level bridge power converter to the power grid.

7. The electrical power system of claim 6, wherein the one or more protection devices comprising a fuse or a switching element.

8. The electrical power system of claim 6, wherein the one or more protection devices comprises switching elements disposed upstream of the rotor-side converter within the multi-level bridge power converter.

9. The electrical power system of claim 6, wherein the electrical power system comprises a wind turbine power system, a solar power system, an energy storage power system or combinations thereof.

10. A method for operating a multi-level bridge power converter of an electrical power system, the power converter comprising a rotor-side converter coupled to a line-side converter via a DC link, the rotor-side converter or the line-side converter comprising a bridge comprising one or more protection devices, the method comprising:

connecting a plurality of phases of the power converter to a common terminal at a DC side of the power converter;

monitoring, via a controller, one or more parameters of a plurality of devices of the multi-level bridge power converter; and, detecting, via the controller, a location of the bridge fault in the one or more of the plurality of devices; and, upon detection of the one or more parameters being indicative of a bridge fault occurring in one or more of the plurality of devices of the multi-level bridge power converter, activating, via the controller, the one or more protection devices of the multi-level bridge power converter to prevent additional bridge faults from occurring in remaining devices of the plurality of devices by: selecting a response from a plurality of protection responses based on the location of the fault, activating the selected response, the selected response comprising activating one or more switching elements of the bridge of the rotor-side converter or of the bridge of the line-side converter, and diverting energy away from the remaining devices of the plurality of devices while maintaining connection of the multi-level bridge power converter to the power grid.

11. The method of claim 10, wherein the one or more parameters comprise at least one of a current, a voltage, a desaturation event, or combinations thereof.

* * * * *